3,316,306
MONOALKYLPENTABORANE-9 AND THE PREPARATION THEREOF

Stanley J. Chiras, Niagara Falls, N.Y., and Eugene J. Mezey, Cleveland, Ohio, assignors, by mesne assignments, to Olin Mathieson Chemical Corporation, a corporation of Virginia
No Drawing. Filed Apr. 15, 1955, Ser. No. 501,742
11 Claims. (Cl. 260—606.5)

This application is a continuation-in-part of our co-pending application Ser. No. 425,328, filed Apr. 23, 1954, now abandoned.

This invention relates to new compositions of matter which are reaction products of pentaborane-9 and certain lower monoalkene hydrocarbons and to a method for their production.

It is known in the art to prepare pentaborane-9. The material is a relatively stable, colorless liquid which has a vapor pressure of 66 mm. of mercury at 0° C. and which boils at 58° C. at atmospheric pressure. Pentaborane-9 is a boron hydride of very high boron content, and has a very high heat of combustion, indicating its utility as a high energy fuel. It is easily vaporized, however, and its vapors are highly toxic when inhaled. There is a need in the art, therefore, for a high energy, liquid product less volatile than pentaborane-9 but at the same time approaching pentaborane in boron content.

In accordance with the present invention, the art is provided with such a product by reacting pentaborane-9 with a monoalkene hydrocarbon having not more than five carbon atoms, as the following examples illustrate.

Example I

A reaction between 2-butene and pentaborane-9 was carried out in a sealed 250 cc. bulb which had been dried and evacuated on a standard high vacuum system. This bulb was equipped with a stopcock, side arm (capillary tip) and a constriction for sealing off the bulb. Into this bulb was transferred 0.06 gram mole of pentaborane-9 and approximately 0.24 gram mole of 2-butene (cis and trans mixture) so that a 1:4 mole ratio existed. The bulb was sealed off at −196° C. at $10^{-5}$ mm. Hg absolute pressure. The bulb and contents were brought up to 70° C. slowly from room temperature over a period of five days and then held at 110°–120° C. for five more days. The system was stored at room temperature until investigated.

After a series of fractional condensations under a high vacuum, part of the original reactants were recovered. There was also isolated a liquid fraction which had a vapor pressure of 4 mm. of mercury at 25° C. This fraction gave reproducible vapor pressure curves for a plot of the log of the pressure against the reciprocal of absolute temperature. The straight line curves gave the following equations in two series of observations:

$$\text{Log } p = [-2.245(1/T) \times 10^3] + 8.19$$
$$\text{Log } p = [-2.262(1/T) \times 10^3] + 8.23$$

wherein $p$ is vapor pressure in mm. of mercury and $T$ is degrees Kelvin. When analyzed, the fraction showed 6.62 percent, 6.57 percent and 6.58 percent by weight of hydrolyzable hydrogen; 44.54 percent, 44.90 percent 45.07 percent, 44.18 percent and 44.37 percent by weight of boron; and 37.57 percent, 39.19 percent; 39.94 percent and 38.62 percent by weight of carbon. The fraction was mono-second-ary-butyl-pentaborane, $C_4H_9B_5H_8$ which calculates 6.74 percent by weight of hydrolyzable hydrogen, 45.36 percent by weight of boron and 40.20 percent by weight of carbon.

Example II

In a manner similar to that described in Example I, pentaborane-9 and propylene in a 1:1 molar ratio were reacted at 110° C. for 120 hours. Then the temperature was raised to 150° C. and the reaction continued for 45 hours. The reaction mixture was then fractionated to yield propylene, pentaborane-9, a colorless liquid having a vapor pressure of 9 mm. of mercury at 27° C., a colorless liquid having a vapor pressure of 0.5 mm. of mercury at room temperature, and a dark brown liquid which was not transferrable in a vacuum.

A second run was performed for 122 hours at 110° C. and then for 187 hours at 150° C. The result obtained was similar to that obtained when the procedure of the preceding paragraph was carried out.

In a third run, still using a 1:1 molar ratio of pentaborane-9 to propylene, the reaction was performed for 24 hours at 150° C. and at a calculated total pressure of 20 atmospheres in a stainless steel reaction vessel. Twenty-one percent of the pentaborane-9 and 46 percent of the propylene employed as reactants were recovered from the reaction product in addition to a liquid having a vapor pressure of the order of 7 mm. of mercury at 20° C. This fraction was substantially pure propyl pentaborane-9, as shown by the analytical results set forth in Table I below.

TABLE I

| Analysis | Percent Found | Percent Calculated for $B_5H_8C_3H_7$ |
| --- | --- | --- |
| H by hydrolysis | 7.35 | 7.60 |
| B by hydrolysis | 43.8 | 41.1 |
| C by oxidation | 34.7 | 34.2 |
| Total Boron, by oxidation | 48.7 | 51.4 |

Example III

In this example, two reactions were run between ethylene and pentaborane-9 in a sealed Pyrex bulb. Under the conditions used, the reactants were always in vapor phase. After cooling, the bulb was opened to a vacuum system and any gas not condensable at −196° C. was estimated and pumped off. The remaining volatile mixture was then separated by fractional condensation in the vacuum system. Alkyl pentaboranes thus isolated were analyzed by nitric acid oxidation (250° C.) and by hydrolysis (150–250° C.) following standard methods. Table II below sets forth the conditions for the two reactions which were carried out in one-liter bulbs.

TABLE II

| Reaction No. | Reactants, Milligram Moles | | Temp., °C. | Time, hrs. | Reactants recovered, milligram moles | | Reactants consumed, milligram moles | |
| --- | --- | --- | --- | --- | --- | --- | --- | --- |
| | $B_5H_9$ | $C_2H_4$ | | | $B_5H_9$ | $C_2H_4$ | $B_5H_9$ | $C_2H_4$ |
| 1 | 68.2 | >112.7 | 150 | 64 | 61.6 | 112.7 | 6.6 | |
| 2 | 61.6 | 63.4 | 150 | 64 | | 59.3 | | 4.1 | actionation of the products yielded three fractions which
described in Table III below.

TABLE III

| Fraction | Vapor pressure, mm. of Hg | Temperature, °C. | Analysis | |
|---|---|---|---|---|
| | | | Percent C | Percent B |
| | 1-1.5 | 29 | 66.2 | 17.5 |
| | 6.4 | 0 | 33.4 | 63.2 |
| | 12.5 | 0 | | | small amount of non-volatile yellow liquid was also formed. Fraction 2 may be impure monoethylpentaborane (calculated for $C_2H_5B_5H_8$: 26.4% C:59.3% B).

*Example IV*

In this example, three experiments were run in a manner similar to that described for Example III but using pentaborane-9 and isobutylene. Table IV sets forth information concerning the reaction conditions and the products produced in each of the reactions.

TABLE V

| Analysis | Percent Found | Percent Calculated for $B_5H_8C_4H_9$ |
|---|---|---|
| H by hydrolysis | 6.37 | 6.74 |
| C by oxidation | 41.3 | 40.20 |
| B by oxidation | 42.8 | 45.36 |

The vapor pressures of the compound followed the expression $$\log P = -2.247 \times 10^3 \times \frac{1}{T} + 8.17$$

wherein P is vapor pressure in mm. of mercury and T is ° Kelvin, for the range 43.6 to 90.0° C., giving an extrapolated boiling point of 152° C.

*Example V*

Using the procedure described for Example III, penta-

TABLE IV.—REACTION OF PENTABORANE-9 AND ISOBUTYLENE

| Reaction No.[1] | Reactants, milligram moles | | Temp., °C. | Time, min. | Reactants recovered, milligram moles | | Reactants consumed, milligram moles | | Products | | | |
|---|---|---|---|---|---|---|---|---|---|---|---|---|
| | $B_5H_9$ | $C_4H_8$ | | | $B_5H_9$ | $iC_4H_8$ | $B_5H_9$ | $iC_4H_8$ | Noncondensable gas at -196° C. | Alkyl pentaborane, millimoles | Alkyl borine, millimoles | Nonvolatile |
| | 54.0 | 53.8 | 150 | 450 | 49.2 | 42.5 | 4.76 | 11.3 | 0.3 | 2.90 | 1.44 | Fair. |
| | 47.4 | 54.0 | 150 | 450 | 44.1 | 48.9 | 3.26 | 5.1 | 0.1 | 1.27 | .48 | Small. |
| | 30.8 | 55.1 | 151 | 450 | 29.4 | 52.4 | 1.44 | 2.7 | 0.1 | 0.70 | .27 | Do. |

[1] All reactions run in 250 ml. bulbs.

From the reaction mixtures listed in Table IV, butyl pentaborane and tri-butyl borane were isolated by fractional condensations. Analysis of the butyl pentaborane gave the results shown in Table V.

borane-9 and 1-butene were reacted in five experiments to produce normally liquid reaction products of the pentaborane and the 1-butene. The reaction conditions and results are set forth in Table VI below.

TABLE VI

| Reaction No. | Reactants, milligram moles | | Theoretical pressure, atm. | Temp., °C. | Reaction Time, hrs. | Reactants recovered, milligram moles | | Reactants used, milligram moles | |
|---|---|---|---|---|---|---|---|---|---|
| | $B_5H_9$ | 1-butene | | | | $B_5H_9$ | 1-butene | $B_5H_9$ | 1-butene |
| 1 | 44.2 | 47.2 | 6.35 | 150±4 | 21 | 44.0 | 42.6 | 0.2 | 4.6 |
| 2 | 61.5 | 62.7 | 4.31 | 150±2 | 15.5 | 59.1 | 59.8 | 2.4 | 2.9 |
| 3 | 68.6 | 63.6 | 4.6 | 150±2 | 63.5 | 64.9 | 54.6 | 3.7 | 9.0 |
| 4 | 44.0 | 42.0 | 6.0 | 150±2 | 96 | 39.2 | 25.2 | 4.8 | 17.1 |
| 5 | 30.6 | 31.3 | 4.3 | 150±2 | 88.5 | 28.6 | 24.8 | 2.0 | 6.5 |

| Reaction No. | Products | | | | Remarks | Appr. size of reaction vessel, ml. |
|---|---|---|---|---|---|---|
| | Noncondensable at STP, ml. | Amount volatile, g. | Vapor pressures of volatile, mm. Hg/°C. | Nonvolatile (at 40°-50° C.) | | |
| 1 | (¹) | 0.1399 | 3.3/36 ~6/32 | Small, orange-brown | | 500 |
| 2 | 1.7 | (²) | | Very small, colorless | | 1,000 |
| 3 | 7.1 | 0.3688 | 3.5/32.5 | Fair, dark brown | | 1,000 |
| 4 | 7.3 | 0.3639 | 3.1/27.4 | Large, dark brown | Very small amount of $B^5H^9$ decomposed during recovery. | 500 |
| 5 | 25 | 0.0800 | 3.4/29 | Fair, orange-yellow | Some $ZnCl_2$ added. | 500 |

[1] Small.
[2] ~3 drops.

Various modifications can be made in the specific procedures of the examples to provide other embodiments which fall within the scope of this invention. For instance, although 2-butene and pentaborane-9 were employed in a molar ratio of 4:1 and other olefins and pentaborane-9 were employed in a molar ratio of about 1:1, this ratio is not critical and can be varied widely, the molar ratio of monoalkene hydrocarbon to pentaborane-9 generally being within the range 0.5:1 to 10:1. Likewise, a wide variety of reaction temperatures can be used. In the specific examples, the reaction temperatures ranged from room temperature to 150° C., but reaction temperatures not within this range can also be utilized. As a general rule, however, a reaction temperature within the range from about 0° C. to 200° C. should be employed. Furthermore, other monoalkenyl hydrocarbons can be employed, for example, the amylenes.

The composition of our invention can be employed as fuels when burned with air. Thus, they can be used as fuels in basic and auxiliary combustion systems in gas turbines, particularly aircraft gas turbines of the turbojet or turboprop type. Each of those types is a device in which air is compressed and fuel is then burned in a combustor in admixture with the air. Following this, the products of combustion are expanded through a gas turbine. The products of our invention are particularly suited for use as a fuel in the combustors of aircraft gas turbines of the types described in view of their improved energy content, combustion efficiency, combustion stability, flame propagation, operational limits and heat release rates over fuels normally used for these applications.

The combustor pressure in a conventional aircraft gas turbine varies from a maximum at static sea level conditions to a minimum at the absolute ceiling of the aircraft, which may be 65,000 feet or 70,000 feet or higher. The compression ratios of the current and near-future aircraft gas turbines are generally within the range from 5:1 to 15: or 20:1., the compression ration being the absolute pressure of the air after having been compressed (by the compressor in the case of the turbojet or turboprop engine) divided by the absolute pressure of the air before compression. Therefore, the operating combustion pressure in the combustor can vary from approximately 90 to 300 pounds per square inch absolute at static sea level conditions to about 5 to 15 pounds per square inch absolute at the extremely high altitudes of approximately 70,000 feet. The products of our invention are well adapted for efficient and stable burning in combustors operating under these widely varying conditions.

In normal aircraft gas turbine practice it is customary to burn the fuel, under normal operating conditions, at overall fuel-air ratios by weight of approximately 0.012 to 0.020 across a combustion system when the fuel employed is a simple hydrocarbon, rather than a borohydrocarbon of the present invention. Excess air is introduced into the combustor for dilution purposes so that the resultant gas temperature at the turbine wheel in the case of the turbojet or turboprop engine is maintained at the tolerable limit. In the zone of the combustor where the fuel is injected the local fuel-air ratio is approximately stoichiometric. This stoichiometric fuel to air ratio exists only momentarily, since additional air is introduced along the combustor and results in the overall ratio of approximately 0.012 to 0.020 for hydrocarbons before entrance into the turbine section. For the higher energy fuels of the present invention, the local fuel to air ratio in the zone of fuel injection should also be approximately stoichiometric, assuming that the boron, carbon and hydrogen present in the products burn to boric oxide, carbon dioxide and water vapor. In the case of the monobutylpentaborane, for example, this local fuel to air ratio by weight is approximately 0.071. For the higher energy fuels of the present invention, because of their higher heating values in comparison with the simple hydrocarbons, the overall fuel-air ratio by weight across the combustor will approximat 0.008 to 0.016 if the resultant gas temperature is to remain within the presently established tolerable tempera ture limits. Thus, when used as the fuel supplied to th combustor of an aircraft gas turbine engine, the product of the present invention are employed in essentially th same manner as the simple hydrocarbon fuel presentl being used. The fuel is injected into the combustor i such manner that there is established a local zone wher the relative amounts of fuel and air are approximately stoichiometric so that the combustion of the fuel can be reliably initiated by means of an electrical spark or some similar means. After this has been done, additional ai is introduced into the combustor in order to cool sufficiently the products of combustion before they enter the turbine so that they do not damage the turbine. Present-day turbine blade materials limit the turbine inlet temperature to approximately 1600–1650° F. Operation at these peak temperatures is limited to periods of approximately five minutes at take-off and climb and approximately 15 minutes at combat conditions in the case of military aircraft. By not permitting operation at higher temperatures and by limiting the time of operation at peak temperatures, satisfactory engine life is assured. Under normal cruising conditions for the aircraft, the combustion products are sufficiently diluted with air so that a temperature of approximately 1400° F. is maintained at the turbine inlet.

The products of our invention can also be employed as aircraft gas turbine fuels in admixture with the hydrocarbons presently being used, such as JP–4. When such mixtures are used, the fuel-air ratio in the zone of the combustor where combustion is initiated and the overall fuel-air ratio across the combustor will be proportional to the relative amounts of borohydrocarbon of the present invention and hydrocarbon fuel present in the mixture, and consistent with the air dilution required to maintain the gas temperatures of these mixtures within accepted turbine operating temperatures.

Because of their high chemical reactivity and heating values, the products of our invention can be employed as fuels in ramjet engines and in afterburning and other auxiliary burning schemes for the turbojet and bypass or ducted type engines. The operating conditions of afterburning or auxiliary burning schemes are usually more critical at high altitudes than those of the main gas turbine combustion system because of the reduced pressure of the combustion gases. In all cases the pressure is only slightly in excess of ambient pressure and efficient and stable combustion under such conditions is normally difficult with simple hydrocarbons. Extinction of the combustion process of the afterburner may also occur under these conditions of extreme conditions of altitude operations with conventional aircraft fuels.

The burning characteristics of the products of our invention are such that good combustion performance can be attained even at the marginal operating conditions encountered at high altitudes, insuring efficient and stable combustion and improvement in the zone of operation before lean and rich extinction of the combustion process is encountered. Significant improvements in the non-afterburning performance of a gas-turbine-afterburner combination is also possible because the high chemical reactivity of the products of our invention eliminates the need of flameholding devices within the combustion zone of the afterburner. When employed in an afterburner, the fuels of our invention are simply substituted for the hydrocarbon fuels which have been heretofore used and no changes in the manner of operating the afterburner need be made.

The ramjet is also subject to marginal operating conditions which are similar to those encountered by the afterburner. These usually occur at reduced flight speeds and extremely high altitudes. The products of our invention will improve the combustion process of the ramjet in in the same manner as that described for the afterburner because of their improved chemical reactivity over that of simple hydrocarbon fuels. When employed in a ramjet the fuels of our invention will be simply substituted for hydrocarbon fuels and used in the established manner.

We claim:
1. A method for the preparation of a liquid reaction product of pentaborane-9 and a monoalkene hydrocarbon having not more than five carbon atoms which comprises reacting the monoalkene hydrocarbon and the pentaborane-9 in a molar ratio within the range from about 1:1 to 10:1 at a temperature within the range from about 0° C. to 200° C.
2. A method according to claim 1 in which the monoalkene hydrocarbon is ethylene.
3. A method according to claim 1 in which the monoalkene hydrocarbon is propylene.
4. A method according to claim 1 in which the monoalkene hydrocarbon is 1-butene.
5. A method according to claim 1 in which the monoalkene hydrocarbon is isobutylene.
6. A method according to claim 1 in which the monoalkene hydrocarbon is 2-butene.
7. Mono-secondary-butylpentaborane-9 having a vapor pressure of about 4 mm. of mercury at 25° C.
8. Monopropylpentaborane-9 having a vapor pressure of about 7 mm. of mercury at 20° C.
9. The compounds of the class $B_5H_8$—R wherein R is an alkyl group containing from two to five carbon atoms.
10. Lower monoalkylpentaborane-9 wherein the alkyl group contains at least two carbon atoms.
11. A method for producing a lower alkylpentaborane-9 which comprises reacting a lower monoalkene with pentaborane-9.

References Cited by the Examiner

Hurd: J. Am. Chem. Soc. 70, 2053–55 (1948).

TOBIAS E. LEVOW *Primary Examiner.*

WILLIAM G. WILES, LEON D. ROSDOL, ROGER L. CAMPBELL, *Examiners.*

C. G. LOVE, L. A. SEBASTIAN, W. F. W. BELLAMY,
*Assistant Examiners.*